United States Patent
Greywall et al.

(10) Patent No.: US 7,126,250 B2
(45) Date of Patent: *Oct. 24, 2006

(54) APPARATUS COMPRISING AN ARRAY OF TIGHTLY SPACED ROTATABLE OPTICAL ELEMENTS WITH TWO AXES OF ROTATION

(75) Inventors: Dennis S. Greywall, Whitehouse Station, NJ (US); Dan M. Marom, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/242,571

(22) Filed: Oct. 3, 2005

(65) Prior Publication Data

US 2006/0028094 A1 Feb. 9, 2006

Related U.S. Application Data (63) Continuation of application No. 10/164,537, filed on Jun. 6, 2002, now Pat. No. 6,984,917.

(51) Int. Cl.
*H02N 1/00* (2006.01)
*G02B 26/08* (2006.01)

(52) U.S. Cl. .................. 310/309; 359/198; 359/224; 359/226; 359/291; 385/18

(58) Field of Classification Search ............. 310/309; 359/223–224, 872, 198, 290, 291, 225, 226; 385/18
See application file for complete search history.

(56) References Cited

U.S. PATENT DOCUMENTS

| | | | |
|---|---|---|---|
| 5,223,969 A | 6/1993 | Jeandeau | 359/196 |
| 5,867,297 A | 2/1999 | Kiang et al. | 359/198 |
| 5,912,608 A | 6/1999 | Asada | 335/222 |
| 5,920,417 A | 7/1999 | Johnson | 359/223 |
| 6,201,631 B1 | 3/2001 | Greywall | 359/245 |
| 6,389,190 B1 | 5/2002 | Solgaard et al. | 385/18 |
| 6,690,850 B1 | 2/2004 | Greywall | 358/18 |
| 6,819,822 B1 | 11/2004 | Behin et al. | 385/18 |

*Primary Examiner*—Karl Tamai (57) ABSTRACT

In one embodiment, a rotatable element includes a plate, a plate support, a cradle, and a cradle support. The plate is coupled to the cradle via the plate support. The cradle is coupled to a surrounding frame by the cradle support. The plate and cradle are suspended over a cavity so that, in conjunction with the plate support and the cradle support, both the plate and cradle are capable of freely rotating about different axes of rotation when suitably actuated. Since the plate is capable of rotating independently of the cradle, yet also rotates when the cradle is rotated, the plate is rotatable about two axes of rotation. In some cases, the axis of rotation of the plate is perpendicular to the axis of rotation of the cradle. Since the cradle does not surround the plate, the plates of adjacent rotatable elements can be placed very close to one another (i.e., as close as about 1 micron) to provide, for example, an array of very-closely-spaced mirrors.

19 Claims, 6 Drawing Sheets

APPARATUS COMPRISING AN ARRAY OF TIGHTLY SPACED ROTATABLE OPTICAL ELEMENTS WITH TWO AXES OF ROTATION

CROSS REFERENCE TO RELATED APPLICATIONS

This application is a continuation of U.S. patent application Ser. No. 10/164,537, filed Jun. 6, 2002, and entitled "Optical Element Having Two Axes of Rotation for Use in Tightly Spaced Mirror Arrays," which has issued as U.S. Pat. No. 6,984,917, the teachings of which are incorporated herein by reference.

FIELD OF THE INVENTION

The present invention relates generally to micro-electromechanical systems. More particularly, the present invention relates to an optical element that is movable about two perpendicular axes.

BACKGROUND OF THE INVENTION

An array of individually-addressable, movable, micromachined mirrors can be used in optical communications networks to route or switch optical signals, e.g., optical cross connect, etc. Each mirror in the array is supported over a group of electrodes in such a way that the mirrors are free to move, e.g., rotate about an axis, etc., when actuated, such as by applying a voltage across a mirror and one or more of the underlying electrodes. By varying the amount that a mirror tilts, or the direction in which it tilts, or both, an optical signal that is incident on the mirror can be directed to a desired location, such as a particular optical fiber.

Some newer mirror arrays have mirrors that are rotatable about two perpendicular axes of rotation, e.g., as is described in U.S. Pat. No. 6,201,631, which is incorporated by reference herein.

It is desirable to provide a high density of optical transfer for communications applications. In particular, in some applications, e.g., de-multiplexing, etc., the mirrors must be very tightly spaced (about 1 to 2 microns) to enable flat pass bands with high spectral efficiency. Gimbaled mirrors, as exemplified by those described in U.S. Pat. No. 6,201,631, are not suitable for such applications because the gimbals present a limitation as to how close adjacent mirrors can be to one another. In particular, there must be a gap between adjacent mirrors that is at least twice the width of a gimbal. In fact, the minimum gap is somewhat larger than this, since the minimum gap must also take into account the gap between the mirror and the gimbal and the gap between the gimbal and the support. Furthermore, some minimum separation distance must be provided between adjacent gimbals to maintain the integrity of the substrate layer to which the gimbals are attached.

It is possible to fabricate gimbaled mirrors that are somewhat smaller than the exemplary structure disclosed in the '631 patent. Nevertheless, with the structure of prior-art gimbaled mirrors, it is not currently possible to achieve a mirror spacing of less than about 15 to 20 microns between prior-art gimbaled mirrors. Consequently, prior-art gimbaled-mirror arrays are not suitable for use in applications that require very close perimeter-to-perimeter spacing, e.g., about 15 microns or less between adjacent mirrors in a mirror array.

SUMMARY OF THE INVENTION

An array of rotatable elements, e.g., mirrors, etc., that avoids some of drawbacks of the prior art is disclosed. In particular, although the rotatable elements in the array are movable about two axes of rotation that have different orientations, e.g., are perpendicular to one another, etc., they are nevertheless capable of being positioned very closely to one another.

This is achieved, in accordance with the principles of the invention, by a rotatable element that includes a plate, a plate support, a cradle and a cradle support. The plate is rotatably coupled to the cradle via the plate support. Likewise, the cradle is rotatably coupled to a surrounding frame, e.g., substrate, etc., by the cradle support. The rotatable element is suspended over a cavity so that, in conjunction with the plate support and the cradle support, both the plate and cradle are capable of freely rotating. In some embodiments, the axis of rotation of the plate is perpendicular to the axis of rotation of the cradle.

Electrodes are disposed in the cavity beneath each rotatable element. In one embodiment, two electrodes are disposed in the cavity under the rotatably-coupled portion of the cradle, on opposite sides of its axis of rotation. Similarly, two electrodes are disposed in the cavity beneath the plate, on opposite sides of its axis of rotation.

When an electrical potential is applied across the plate and one of its underlying electrodes, the plate rotates out-of-plane, i.e., out of the plane defined by the cradle, which is the plate in which the plate lies when it is in its quiescent or unactuated position, about its axis of rotation toward the electrified electrode. This provides one axis of rotation for the plate. When an electrical potential is applied across the cradle and one of its underlying electrodes, the cradle rotates out-of-plane, i.e., of the substrate or frame, about its axis of rotation toward the electrified electrode. As the cradle rotates, the plate rotates with it. Furthermore, the plate can be rotated independently of the cradle, providing it with a second axis of rotation.

The plate is advantageously capable of providing an optical function. For example, in some embodiments, the plate functions as a mirror. Unlike prior-art gimbaled mirrors, in which the gimbal completely surrounds the mirror, in a rotatable element in accordance with the principles of the invention, the cradle does not completely surround or encircle the plate, e.g., mirror. Consequently, adjacent mirrors in an array of rotatable elements can, advantageously, be very closely spaced. This makes them suitable for use in some optical applications in which the prior-art gimbaled mirrors cannot be used.

An array of rotatable elements of the invention is advantageously used in an optical de-multiplexer or switch having: (i) a plurality of ports having an input port and one or more output ports; (ii) a diffraction grating optically coupled to the input and output ports; and (iii) a mirror array optically coupled to the diffraction grating. In one embodiment, the mirror array comprises a frame and a plurality of rotatable elements, each having a mirror adapted to rotate with respect to the frame. The diffraction grating is adapted to produce a plurality of spatially separated optical signals corresponding to components of a wavelength-division multiplexed (WDM) signal applied to the input port. Each mirror in the array is adapted to receive a spatially separated signal and direct the received signal back to the diffraction grating, which further directs said signal to an output port, wherein orientation of the mirror with respect to the frame determines to which output port the signal is directed.

DETAILED DESCRIPTION

The terms listed below are given the following definitions for the purposes of this specification.

"Coupled" means that (coupled) elements interact with one another, e.g., by a direct physical connection, by an indirect mechanical linkage, through electrostatic, magnetic or optical interaction, etc. The coupled elements can, but do not have to be, physically attached to one another. For example, in some instances, two coupled elements will be indirectly linked, such as through a third element, etc. When two elements that are indirectly linked are referred to as "coupled," it means that movement of one of the coupled elements influences, e.g., imparts motion to, etc., the other coupled element. This ability to influence is not necessarily reciprocal as between the two coupled elements.

"Stress" means tensile stress or compressive stress.

"Torsional" refers to a twisting motion (of a connector, etc.) such as results from two opposing turning forces acting at right angles to the rotational axis (of the connector, etc.).

"Cradle," which is used as a noun, refers to a movable support element that supports (cradles) an element, e.g., a plate, etc., that is free to move. Furthermore, the cradled element is free to move independently of the cradle. The cradle itself is movably supported by another element, e.g., a substrate, etc. Movement of the cradle causes the cradled element to move. That is, the orientation in space of the cradled element changes as the cradle moves. The term "cradle," as used herein, is not intended to imply any particular structure and none is to be inferred.

"Frame," which is used as a noun, refers to a stationary support element that supports an element that is free to move. The frame can be, for example, a substrate layer that surrounds the mechanical (movable) elements.

"Optical Functionality" or "Optical Function" means an ability of affecting an optical signal in some predictable way. Example of optical functionalities include, without limitation, the ability to reflect, diffract, filter, modulate, polarize, focus, or collimate an optical signal. In other words, an element that is characterized by such functionality is capable of functioning as a fixed-reflectivity mirror, a diffraction grating, an optical filter, an optical modulator, a polarizer or a lens, respectively. An additional optical functionality is the ability to function as a wavelength-selective switch. In some variations, an element will intrinsically possess an optical functionality, e.g., due to its composition, etc. In some other variations, an element can be modified or processed in some way, such as by depositing a reflective material, or by depositing layers of material have particular refractive indices, or by depositing and patterning layers to create an optical device (a modulator), etc., so that it is capable of performing an optical function.

Figure 1:
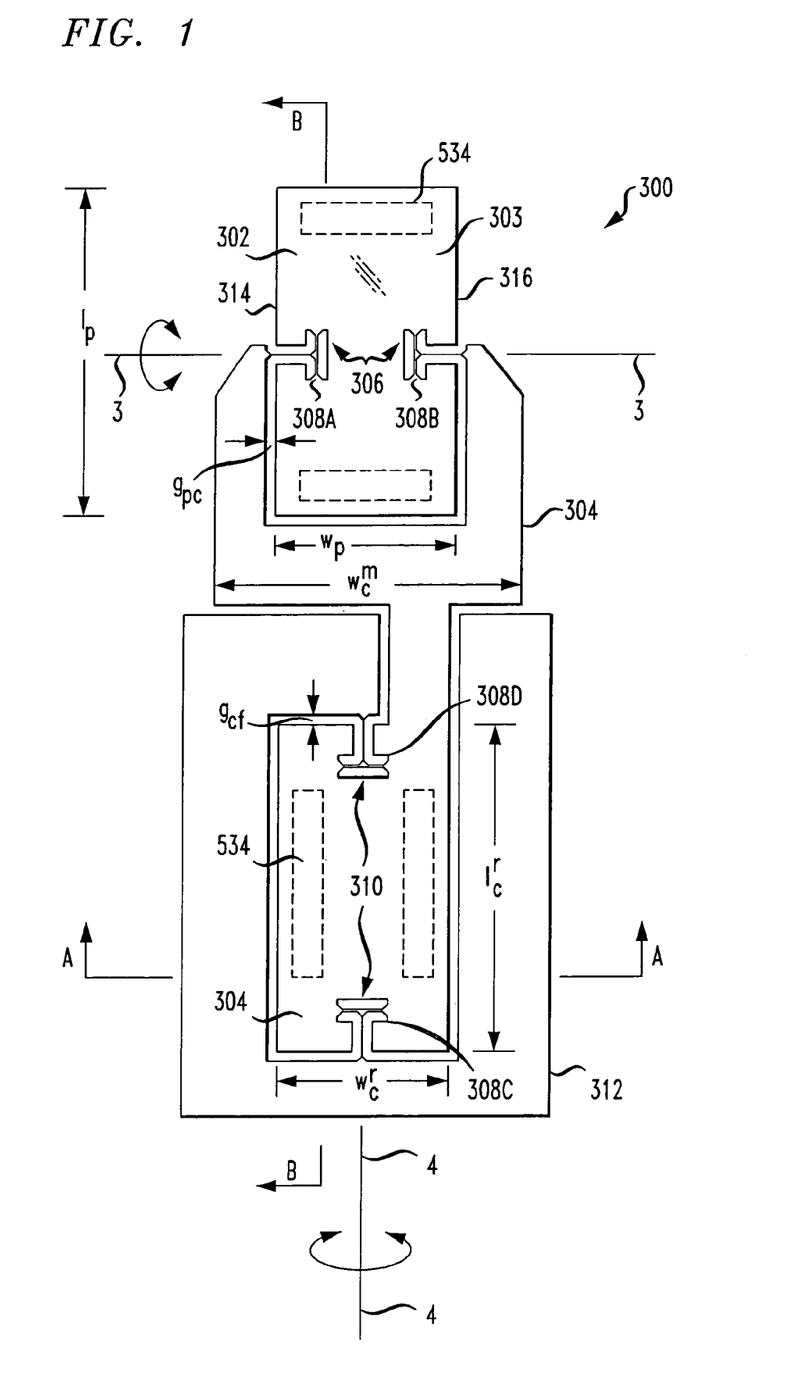
FIG. 1 depicts a rotatable element having a cradle and a plate, in accordance with the principles of invention.

I.A. Structure of a Rotatable Element in Accordance with the Principles of the Invention FIG. 1 depicts rotatable element 300. Rotatable element 300 includes plate 302, cradle 304, plate support 306 and cradle support 310, inter-related as shown. Rotatable element 300 is coupled to stationary frame 312. More particularly, cradle support 310 couples cradle 304 to frame 312. Plate 302 is advantageously, but not necessarily, capable of performing an optical function.

For the illustrative embodiment, portion 303 of plate 302, i.e., the portion of the plate that is "above" axis 3-3 in FIG. 1, has a reflective surface such that it functions as a fixed-reflectivity mirror. It is will be understood, however, that in some variations of the illustrative embodiment, plate 302 has a different optical functionality, such as one or more of the other functionalities listed above.

Those skilled in the art will know how to use standard techniques to modify plate 302, e.g., via metallization, via thin-film optics techniques, via lithography, etc., so it provides an optical function.

Plate 302 is rotatably coupled to cradle 304 via plate support 306. That is, plate support 306 enables plate 302 to rotate about rotational axis 3-3 when the plate is suitably actuated. In similar fashion, cradle 304 is rotatably coupled to frame 312 via cradle support 310. The cradle support enables cradle 304 to rotate about rotational axis 4-4 when the cradle is suitably actuated. As depicted in FIG. 1, rotational axis 3-3 is aligned with plate support 306 and rotational axis 4-4 is aligned with cradle support 310. Furthermore, rotational axis 3-3 is perpendicular to rotational axis 4-4.

In the illustrative embodiment, plate support 306 and cradle support 310 are each implemented as paired torsional members 308, individually identified as torsional members 308A and 308B (for plate support 306) and torsional members 308C and 308D (for cradle support 310). Members 308 are referred to as "torsional" members because they twist to enable an attached element, e.g., plate 302, cradle 304, etc., to rotate (see, Definitions, above).

With continuing reference to the illustrative embodiment depicted in FIG. 1, one end of each of the paired torsional members depends from opposed regions, e.g., sides, portions, etc., of an element that moves, e.g., plate 302, etc. The other end of each of the paired torsional members depends from opposed regions of an element that functions as a support for the movable element.

Thus, in the illustrative embodiment, one end of each of torsional members 308A and 308B depend from respective opposed sides 314 and 316 of plate 302, i.e., the element that moves. The other end of torsional members 308A and 308B depend from opposed portions of cradle 304, i.e., the element that supports plate 302. Likewise, one end of each of torsional members 308C and 308D depends from opposed portions 318 and 320 of cradle 304, i.e., an element that moves, while the other end depends from opposed portions of frame 312, i.e., the element that supports cradle 304.

As depicted in FIG. 1, torsional members 308A and 308B are substantially recessed within plate 302 and torsional members 308C and 308D are substantially recessed within cradle 304.

Recessing torsional members 308 in this fashion decreases what would otherwise be a larger gap between the rotatable element, e.g., plate 302, etc., and the structure to which it's coupled, e.g., cradle 304, etc.

Figure 2:
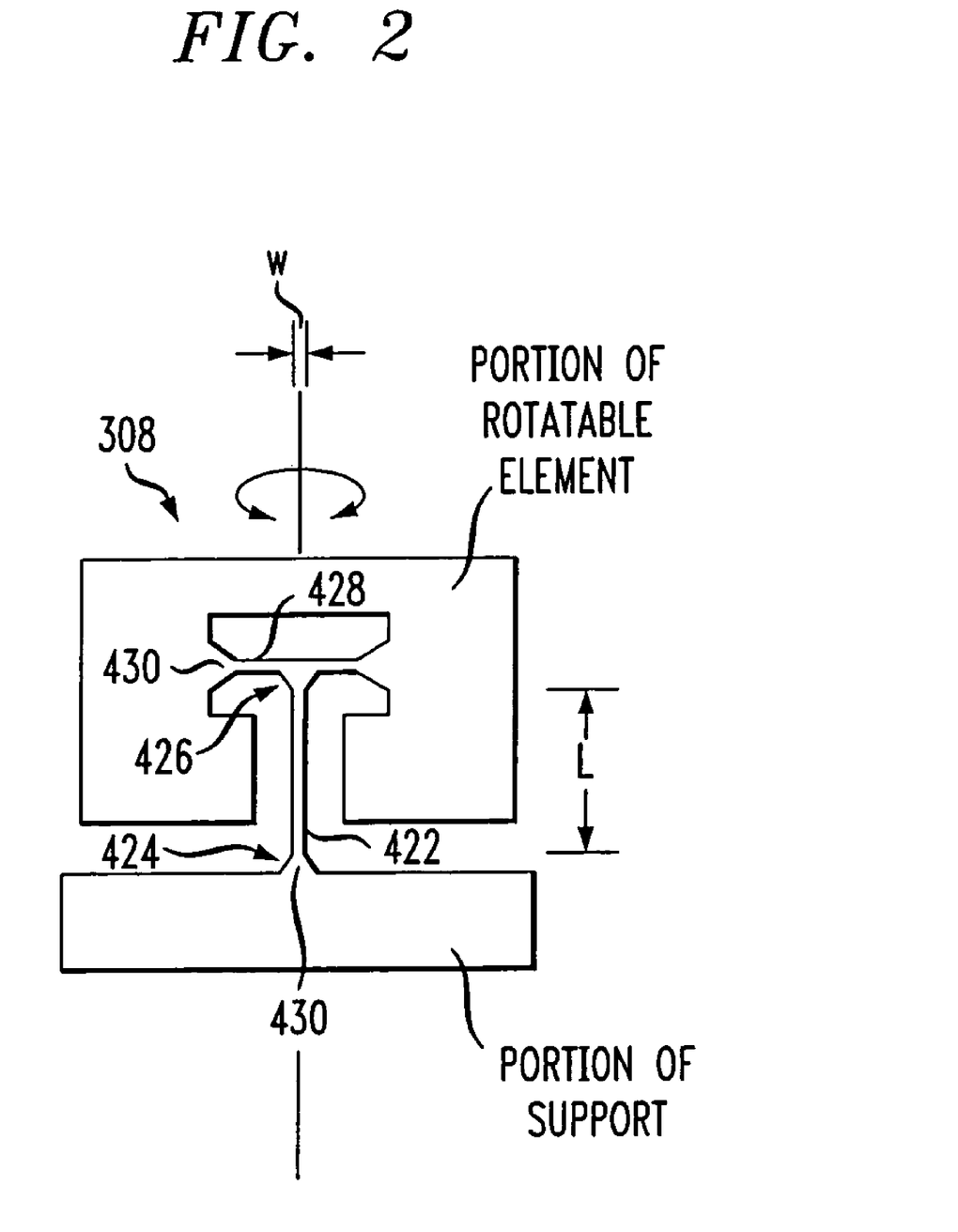
FIG. 2 depicts a torsional support that rotatably couples rotatable elements to other rotatable or non-rotatable elements.

FIG. 2 provides further detail of torsional members 308. As depicted in FIG. 2, torsional member 308 includes connector 422 and cross-piece 428, which are joined in a "T" configuration. Connector 422 couples two elements: (1) an element that moves and (2) its support structure. For example, with regard to torsional members 308A and 308B, connector 422 couples plate 302 to cradle 304. As to torsional members 308C and 308D, connector 422 couples cradle 304 to frame 312. The axis of rotation (of the element that moves) is aligned with the paired torsional members 308 that couple the element to its support structure.

In the illustrative embodiment depicted in FIG. 2, end 424 of connector 422 is attached to the support structure, e.g., cradle 304, etc., while the other end, end 426, couples to the element that moves via cross-piece 428. Cross-piece 428 functions as a "shock absorber" for connector 422. In particular, cross-piece 428 is capable of flexing, as necessary, to absorb any stresses on connector 422, as commonly arise during fabrication procedures. Connector 422 and cross-piece 428 each include widened region 430 near points of attachment. This widened region decreases stress concentration at the points of attachment.

It will be understood that other types, e.g., configurations, of torsional members, as are known in the art, can be used. Furthermore, other types of members, i.e., non-torsional members, that are suitable for rotatably coupling two elements can suitably be used as well.

Figure 3:
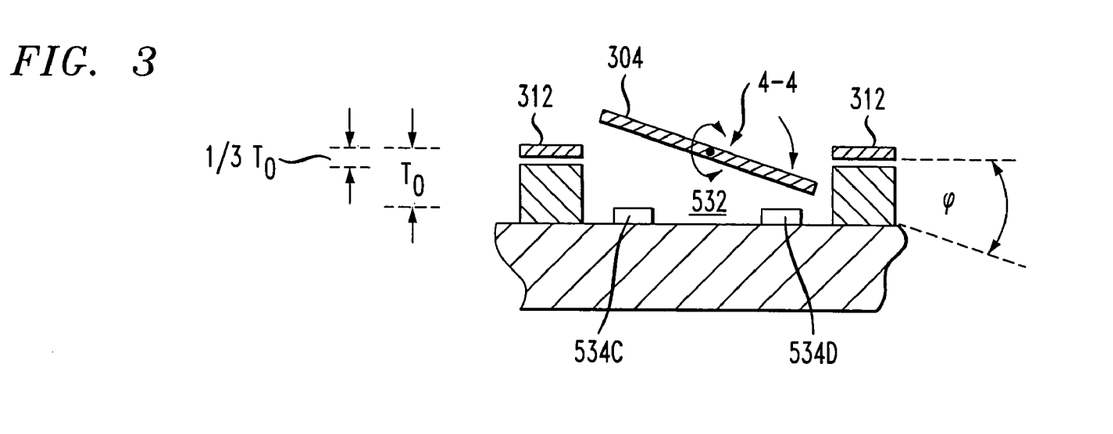
FIG. 3 depicts a cross-sectional view of the rotatable element of FIG. 1 along the line A—A and in the direction indicated, but with the cradle partially rotated.
Figure 4:
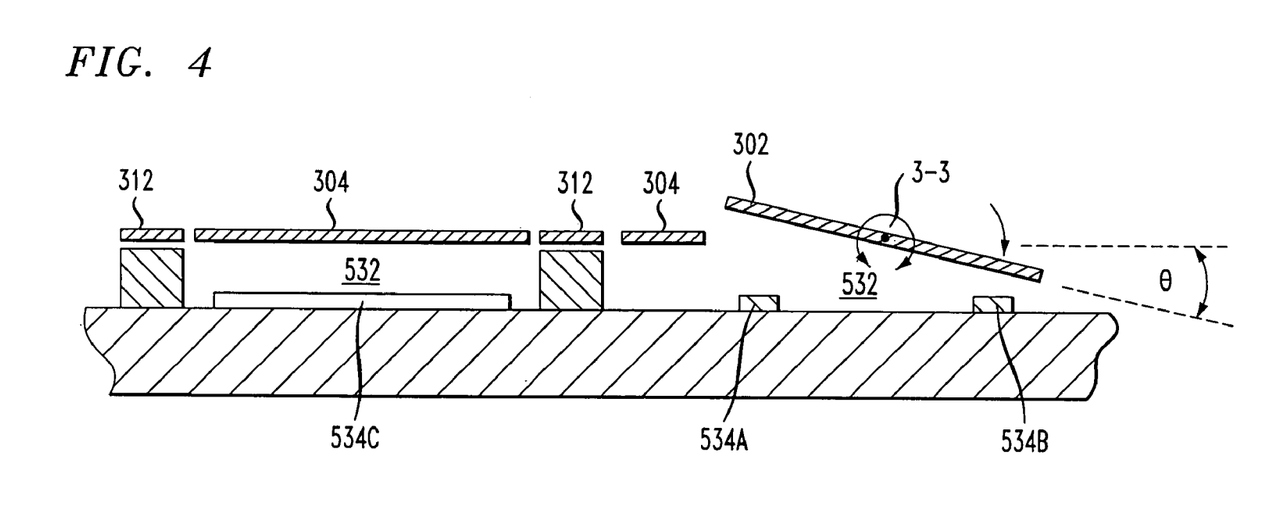
FIG. 4 depicts a cross sectional view of the rotatable element of FIG. 1 along the line B—B and in the direction indicated, but with the plate partially rotated.

FIGS. 3 and 4 depict cross-sectional views of rotatable element 300 depicted in FIG. 1. FIG. 3 is cross section along the line A—A, viewed in the direction shown, and FIG. 4 is a cross section along the line B—B, viewed in the direction shown. As depicted in those Figures, plate 302 and cradle 304 are suspended over cavity 532 so that they are free to rotate. Electrodes 534A, 534B, 534C, and 534D are disposed in cavity 532. More particularly, electrodes 534A and 534B underlie plate 302, with one electrode on each side of axis-of-rotation 3-3. Electrodes 534C and 534D underlie a portion of cradle 304, with one electrode on each side of axis-of-rotation 4-4.

When an electrical potential is applied across an element that moves, e.g., plate 302, etc., and one of the underlying electrodes, the element rotates out-of-plane, i.e., out of the plane defined by the support structure, about its axis of rotation toward the electrified electrode.

For example, with reference to FIG. 3 (which shows a portion of cradle 304), assume that an electric potential is applied across cradle 304 and electrode 534D. As a consequence, cradle 304 rotates out-of-plane of frame 312 about axis 4-4 such that the portion of cradle 304 that overlies electrode 534D moves downward toward that electrode (see FIG. 3). Since plate 302 is coupled to cradle 304, plate 302 also rotates about axis 4-4, i.e., the cradle's axis of rotation, although, for clarity, rotation of plate 302 is not depicted in FIG. 3.

Referring to FIG. 4 (which shows portions of both cradle 304 and plate 302), assume that a potential is applied across plate 302 and electrode 534B. In response, the portion of plate 302 that overlies electrode 534B is drawn toward that electrode, rotating out-of-plane of cradle 304 about axis 3-3. Since plate 302 rotates (about axis 4-4) when cradle 304 rotates, plate 302 is capable of rotating about two perpendicular axes: axis 3-3 and axis 4-4.

It is understood that for rotatable element 300 to move as has been described, electrodes 534, plate 302, and cradle 304 must be electrically coupled to a controlled voltage source. The controlled voltage source and the various electrical connections are not depicted in the Figures for the sake of clarity and to aid in focusing the reader on elements that are germane to an understanding of the principles of the invention.

It is notable that in prior-art gimbaled mirrors, the gimbal completely surrounds the mirror. In contrast, in rotatable element 300, cradle 304 does not completely surround plate 302. In fact, if region 303 (see FIG. 1) of plate 302 is considered to be the "mirror," then cradle 304 does not surround any part of the "mirror." Stated differently, in rotatable element 300, the segment of rotational axis 3-3 that is defined by the location of torsional members 308A and 308B does not overlap or intersect the segment of rotational axis 4-4 that is defined by the location of torsional members 308C and 308D. This is in contrast to the corresponding "segments" of the two rotational axes of the prior-art gimbaled mirrors, wherein the segments do overlap, i.e., in the center of the mirror.

The difference in structure between prior-art gimbaled mirrors and rotatable element 300 can be described in yet another way. In particular, in prior-art gimbaled mirrors, the center of mass of all the electrodes for a given gimbaled mirror aligns with the center of mass of the mirror. In rotatable element 300, however, the center of mass of all the electrodes for a given rotatable element does not align with the center of mass of plate 302.

As described later in this specification, these differences in structure enable rotatable element 300 to be used in a variety of applications, notably optical communications, for which the prior-art gimbaled mirrors are unsuitable.

EXAMPLE

An illustrative design for rotatable element 300 in accordance with the principles of the invention is presented in this Example.

Tables I and II, below, provide performance parameters for rotatable element 300. The parameters are given as a function of:

(1) Length, L, of connector 422 of torsional members 308 (see, FIG. 2).

(2) Width, W, of connector 422 of torsional members 308 (see, FIG. 2).

(3) Gap, $T_o$, between plate 302 (or cradle 304) and the underlying electrodes, see, e.g., FIG. 3.

The dimensions of rotatable element 300 (see, FIGS. 1 and 2) are as follows:

| | | |
|---|---|---|
| length, $l_p$, of plate 302: | 150 microns | |
| width, $w_p$, of plate 302: | 79 microns | |
| width, $w^m_c$, of cradle 304: | 140 microns | (at widest point) |
| width, $w^r_c$, of cradle 304: | 79 microns | (rectangular portion above electrodes) |
| length, $l^r_c$, of cradle 304: | 150 microns | (rectangular portion above electrodes) |

-continued

| | | |
|---|---|---|
| length, $l_c$, of cradle 304: | 331 microns | (length of full cradle 304) |
| gap, $g_{pc}$: | 3 microns | (gap between plate 302 and cradle 304) |
| gap, $g_{cf}$: | 3 microns | (gap between cradle 304 and frame 312) |
| thickness of plate 302: | 1 micron | |
| thickness of cradle 304: | 1 micron | |
| length of cross piece 428: | 6 microns | |
| length of widened region 430: | 1 micron | |
| width of widened region 430: | 1 micron | |

The angle of rotation, $\phi$, of cradle 304 (see, FIG. 3) is limited by certain dimensions of rotatable mirror 300. This limitation results from one of two different constraints. One constraint on rotation is that continued rotation of cradle 304 will result in the cradle making contact with underlying electrode 534. The angle of rotation at contact, $\phi_{touch}$, is dependent upon the width, $w^r_c$, of cradle 304 (i.e., the width of the portion of the cradle that is above the electrodes) and the gap, $T_o$, between the cradle and an underlying electrode. With a width, $w^r_c$, of 79/2=39.5 microns, and a gap, $T_o$, of 10 microns, $\phi_{touch}$=8.2 degrees. This is one limitation on angle of rotation, $\phi$, of cradle 304.

The second constraint on rotation arises due to the use of an electrostatic force (in the illustrative embodiment) as the actuating force. In particular, due to the nature of electrostatics, an instability occurs when the displacement of an element equals or exceeds ⅓ of the gap between the attracting elements. This instability causes the movable element to "snap-down" and contact the fixed element. Consequently, the displacement of the edge of cradle 304, for example, in a "vertical" direction (as it rotates) is restricted to a distance that is less than ⅓ of the distance between cradle 304 and underlying electrode 534 (see, FIG. 3). In other words:

[4] Displacement<⅓$T_o$

This distance defines critical angle of rotation, $\phi_c$, of cradle 304. The cradle cannot be rotated beyond this point. This behavior is well known to those skilled in the art. For the configuration and dimensions provided above, the critical angle of rotation for cradle 304, $\phi_c$, is 12.6 degrees.

For the Example, the critical angle of rotation, $\phi_c$, is greater than the angle of rotation at contact, $\phi_{touch}$: 12.6>8.2. Consequently, rotation of cradle 304 is limited by contact (not instability) to 8.2 degrees.

The same considerations apply to plate 302. For plate 302, the angle of rotation at contact, $\theta_{touch}$, is 7.7 degrees. The critical angle of rotation, $\theta_c$, is 9.2 degrees. Like cradle 304, the rotation of plate 302 is limited by contact, which, for this example, is 7.7 degrees.

TABLE I

Performance of Rotatable Element for $T_o$ = 10 microns

| $T_o$ <μm> | Connector Width <μm> | Connector Length <μm> | $V^\phi_{critical}$ <volts> | $V^\theta_{critical}$ <volts> |
|---|---|---|---|---|
| 10 | 0.30 | 8 | 112 | 124 |
| 10 | 0.35 | 10 | 125 | 138 |
| 10 | 0.35 | 12 | 114 | 126 |
| 10 | 0.40 | 12 | 135 | 149 |

Table I shows the voltage requirement at the critical angle of rotation for both cradle 304, which is $V^\phi_{critical}$, and for plate 302, which is $V^\theta_{critical}$. The voltage that is required to obtain the maximum (for this illustration) cradle rotation of 8.2 degrees and the maximum (for this illustration) plate rotation of 7.7 degrees will be less than the critical voltages shown. (Again, this is because, in the Example, the maximum angle of rotation for both plate 302 and cradle 304 is less than the critical angle of rotation.)

Table II, below, provides the same type of information as Table I, but for a configuration wherein the gap, $T_o$, between plate 302 or cradle 304 and electrodes 534 is increased to 12 microns. For this illustration, $\phi_{touch}$=9.9 degrees, $\phi_c$=15.2 degrees and $\theta_{touch}$, is 9.2 degree and $\theta_c$=11.1 degrees. As before, the voltage that is required to obtain the maximum (for this illustration) cradle rotation of 9.9 degrees and the maximum (for this illustration) plate rotation of 9.2 degrees will be less than the critical voltages shown.

TABLE II

Performance of Rotatable Element for $T_o$ = 12 microns

| $T_o$ <μm> | Connector Width <μm> | Connector Length <μm> | $V^\phi_{critical}$ <volts> | $V^\theta_{critical}$ <volts> |
|---|---|---|---|---|
| 12 | 0.30 | 8 | 148 | 164 |
| 12 | 0.35 | 10 | 165 | 183 |
| 12 | 0.35 | 12 | 151 | 167 |
| 12 | 0.40 | 12 | 179 | 198 |

As Tables I and II and the accompanying description indicate, for the illustrative embodiment and illustrative dimensions, potential differences in the range of about 100 volts to about 200 volts will rotate plate 302 and cradle 304 up to about 15 degrees. Smaller voltages result in less rotation. And, generally, as the gap, $T_o$, between plate 302 or cradle 304 and underlying the electrodes increases, the maximum allowable rotation increases (both the angle for contact and the critical angle), but so do the voltage requirements.

Relatively small rotations (i.e., a few degrees) are all that is required for many applications of rotatable element 300.

Figure 5:
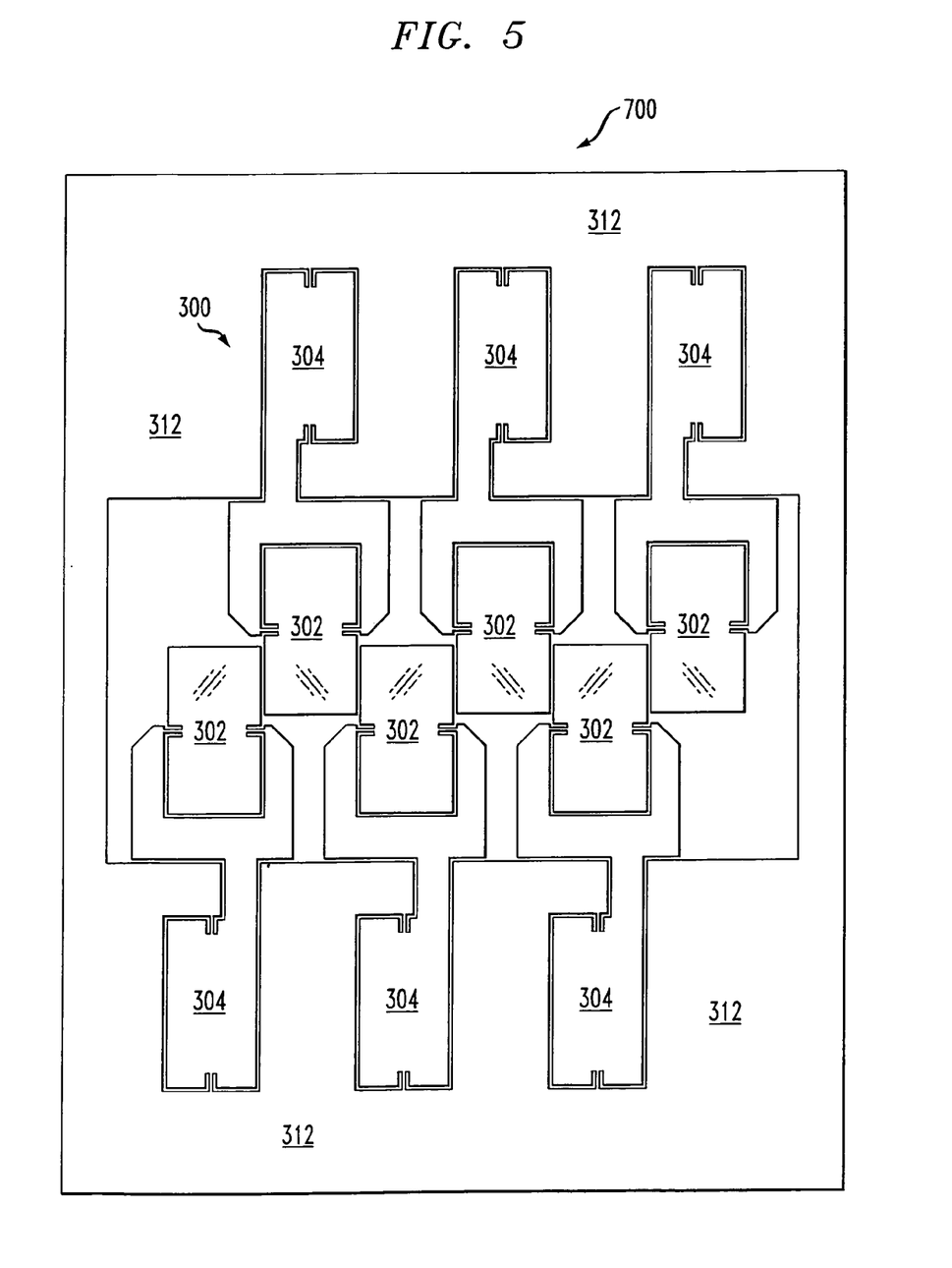
FIG. 5 depicts an array of rotatable elements in accordance with the principles of the invention.

I.B. Structure of an Array of Rotatable Elements In Accordance With the Principles of the Invention FIG. 5 depicts an array 700 of rotatable elements 300. Each rotatable element 300 in the array includes plate 302 and cradle 304, as previously described, see, e.g., FIG. 1 and the accompanying description.

Rotatable elements 300 are surrounded by frame 312 and are suspended over cavity 532, see, e.g., FIGS. 3 and 4. Pairs of electrodes 534 (not depicted in FIG. 5) underlie plate 302 and a portion of cradle 304. Each rotatable element 300 within array 700 is individually addressable. Furthermore, plate 302 and cradle 304 of each rotatable element 300 can be individually actuated. In other words, plate 302 can be made to rotate about either one axis, i.e., one of either the rotational axis of plate 302 or the rotational axis of cradle 304, or about two axes.

Since cradle 304 does not completely surround plate 302 (in contrast to the manner in which the gimbal surrounds the mirror in prior-art gimbaled mirrors), plates 302 of adjacent rotatable elements 300 in array 700 can be placed in near-abutting relation. More particularly, in some embodiments, adjacent plates 302 are placed within 15 microns of one another. In some other embodiments, adjacent plates 302 are placed within 10 microns of one another. In some additional embodiments, adjacent plates 302 are placed within 5 microns of one another. In some other embodiments, adjacent plates 302 are advantageously placed as close as about 1 micron from one another. The spacing between adjacent plates 302 will, in some instances, be dictated by application specifics.

Array 700 of rotatable elements 300 has a variety of uses, many of which pertain to optical telecommunications. One such use is described below.

I.C. Demultiplexer Incorporating an Array of Rotatable Mirrors

The transmission capacity of optical networks is significantly increased using wavelength division multiplexing ("WDM"). In a WDM communications network, many optical signals are superimposed on a single optical fiber.

Each signal has a different wavelength, which defines a WDM "channel."

Typically, the channels in a WDM communications system are routed selectively along different paths as a function of wavelength ("wavelength routing"). To accomplish this, optical network nodes, which provide switching and routing functions in an optical network, must be capable of "recognizing" each channel independent of other channels.

One device that is capable of providing this "recognition" to perform wavelength routing is a de-multiplexer. The de-multiplexer spatially resolves the plural WDM channels and delivers each channel or spectral component to a desired output fiber.

Figure 6:
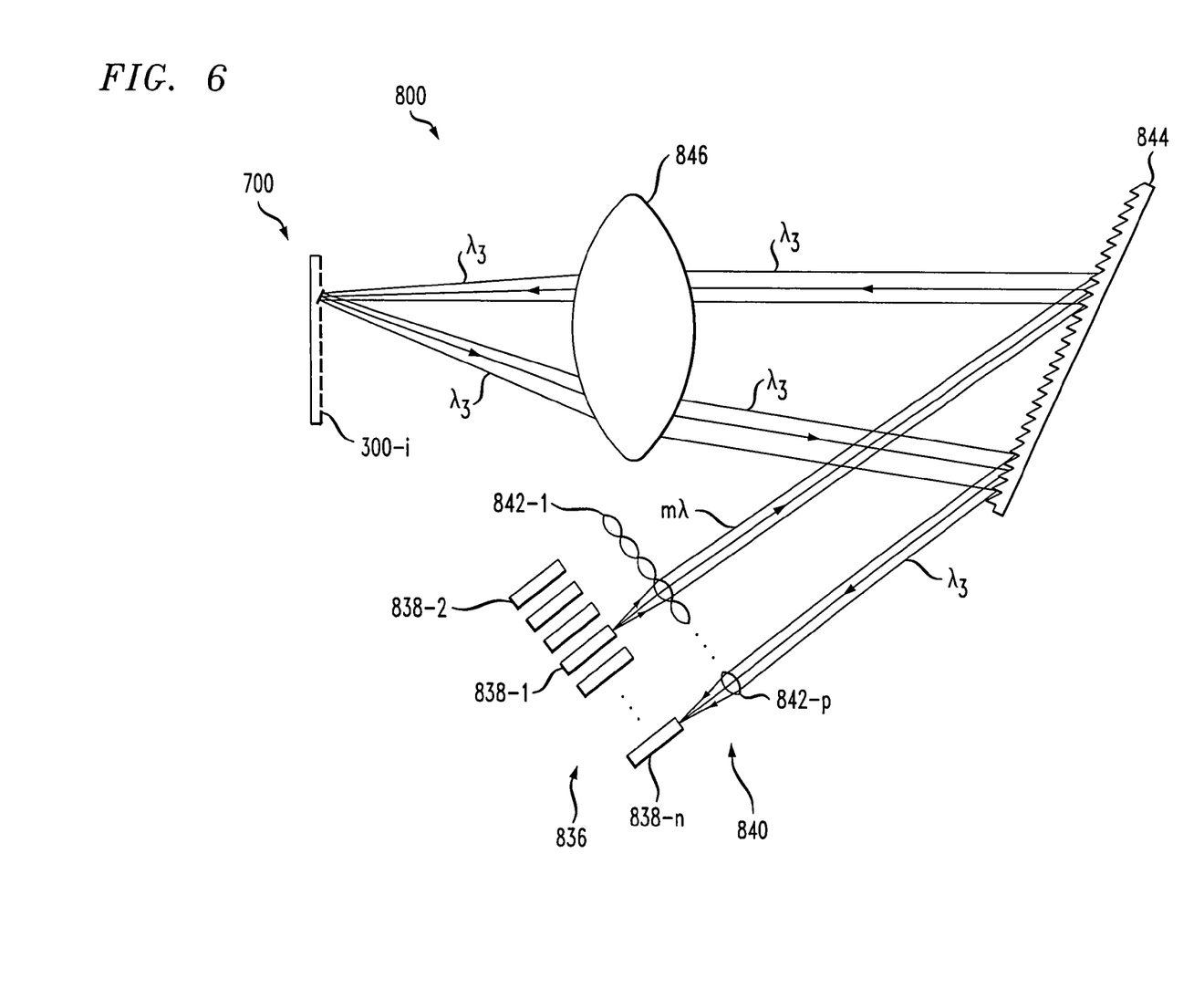
FIG. 6 depicts a de-multiplexer in accordance with the principles of the invention.

In accordance with the principles of the invention, an array of rotatable elements, as has been described herein, is optically coupled to lenses, a diffraction grating and an input and output ports to provide a de-multiplexing capability. FIG. 6 depicts illustrative de-multiplexer 800, which is based on a de-multiplexer that is described in U.S. patent application Ser. No. 09/944,800, which is incorporated by reference herein.

As depicted in FIG. 6, de-multiplexer 800 includes array 700 of rotatable elements 300-i, i=1, m, array 836 of input/output ports 838-j, j=1, n, array 840 of collimating/focusing lenses 842-k, k=1, p, diffraction grating 844, and collimating/focusing lens 846, inter-related as shown. For this application, rotatable elements 300-i are rotatable mirrors.

Since array 700 provides rotatable mirrors that have two perpendicular rotation axes, input/output port array 836 is advantageously, but not necessarily, configured as a two-dimensional array of ports 838-j. (If the mirrors in the array had only a single rotational axis, then the input/output ports would have to be arranged linearly.) Since input/output ports 838-j are configured as a two-dimensional array, collimating/focusing lenses 842-k should be configured as a two-dimensional array as well. For simplicity and clarity, input/output port array 836 and array 840 of lenses are depicted in FIG. 6 as linear arrays.

Array 836 has n, ports 838-j, including one input port 838-1 and n-1 output ports 838-2, 838-3, . . . , 838-n. The assignment of port 838-1 as the input port, and its particular location, is arbitrary. Input port 838-1, which is typically a single-mode optical fiber, carries the multiple optical wavelengths (i.e., channels) λ-l, l=1, q, of WDM signal mλ.

As WDM signal mλ emerges from port 838-1, it diverges due to diffraction effects. Ports 838-j are disposed at the front focal plane of lens array 840. Input/output port array 836 is aligned with lens array 840 so that each port 838-j is on the optical axis of its matching lens 842-k. One of lens 842-k in array 840 receives diverged WDM signal mλ from port 838-1 and collimates it.

Collimated WDM signal mλ is received by diffraction grating 844. Diffracting grating 844 causes wavelength-dependent diffraction, which results in the spatial separation of the spectral components, i.e., constituent wavelengths, of a multi-wavelength signal such as WDM signal mλ. Consequently, diffraction grating 844 spatially resolves the individual channels λ-l, l=1, q, of signal mλ as a function of wavelength.

Figure 8:
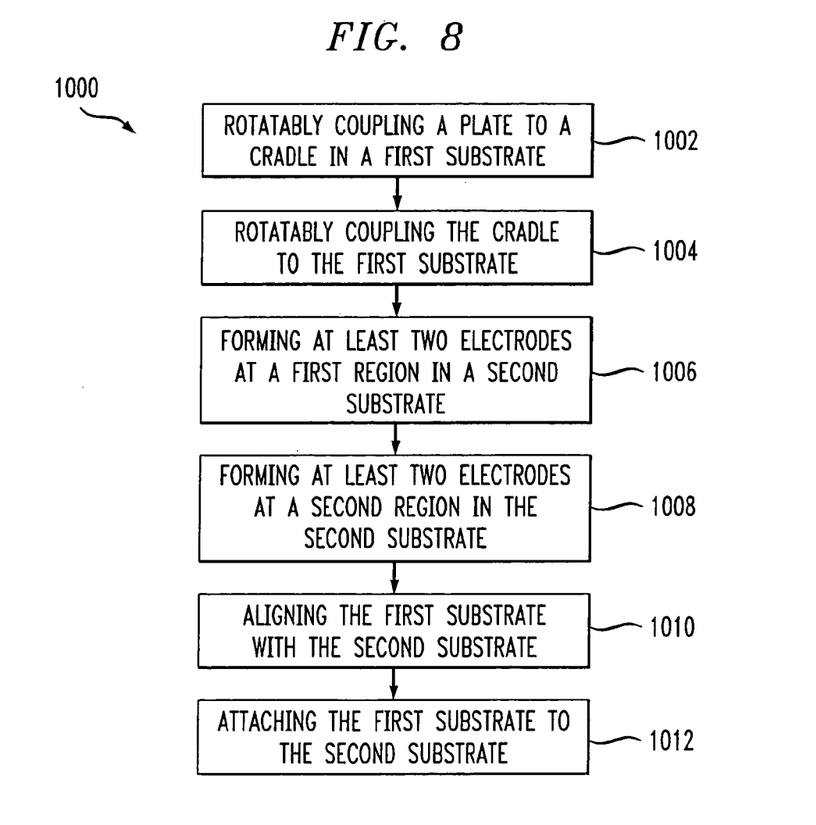
FIG. 8 depicts a method for making a rotatable element or an array of rotatable elements in accordance with the principles of the invention.

The diffraction of WDM signal mλ generates q signals or beams, one for each wavelength λ-1 through λ-q of the WDM signal. Each of the diffracted signals propagates in a unique direction. For clarity, the optical path of only one of the channels or wavelengths (λ-3) is depicted in FIG. 8.

The diffracted signals λ-l are received by collimating/focusing lens 846 and focused at its front focal plane. Each of the signals λ-1 through λ-q focuses at a different location along the focal plane, as a function of its wavelength. Array 700 of rotatable mirrors 300-i, which is disposed at the front focal plane of lens 846, receives the signals λ-l. Rotatable mirrors 300-i are positioned so that each signal or channel λ-l is focused on a different rotatable mirror 300-i. Those skilled in the art will know how to design grating 844 and lens 846 to provide sufficient spatial separation of each signal at the front focal plane of lens 846.

Each rotatable mirror 300 can be tilted, responsive to a control signal, such that the reflected signal λ-l propagates in a new direction wherein the signal ultimately couples into a desired one of output ports 838-2 through 838-k (if the mirror were not tilted, the reflected signal would couple back into input port 838-1).

More particularly, the signals that are reflected from array 700, which are diverging, are collimated by collimating/focusing lens 846. The collimated signals are diffracted off of grating 844 toward array 840 of collimating/focusing lens 842-i, i=1, k. Each signal is received by one of the lenses 842-i, and is focused at the front focal plane of that lens. Each signal then couples into a desired one of output ports 838-2 through 838-k.

In some embodiments, the number, m, of rotatable mirrors 300-i, equals the number, n-1, of output ports 838-j, equals the number, p, of collimating/focusing lenses 842-k, which equals the number, q, of channels in the WDM signal mλ. For example, for 32, 36, 64 and 128 channel WDM signals, array 700 would include 32, 36, 64 and 128 rotatable elements (mirrors), array 838 would include 32, 36, 64, and 128 input/outputs 838, etc., respectively. For any of these WDM signals, adjacent plates 302 are advantageously spaced by about 1 to 2 microns.

In some other embodiments, however, there are fewer rotatable mirrors 300-i, fewer output ports 838-j, and fewer collimating/focusing lenses 842-k, than the number, q, of channels in the WDM signal mλ. Furthermore, there does not need to be agreement as between the number, m, of rotatable mirrors 300-i, the number, n-1, of output ports 838-j or the number, p, of collimating/focusing lenses 842-k. Also, due to the action of rotatable mirrors 300-i, more than one wavelength channel λ-j can be directed to any one output port 838-j.

As indicated above, de-multiplexer 800 requires a mirror array having very tight mirror-to-mirror spacing (as close as about 1 micron). Such spacing is possible using array 700 of rotatable elements 300, in accordance with the principles of the invention. But it's not possible to achieve that spacing with the gimbaled mirrors of the prior art, and their use for this application would be very impractical, e.g., high insertion losses, cross talk, etc.

Figure 7:
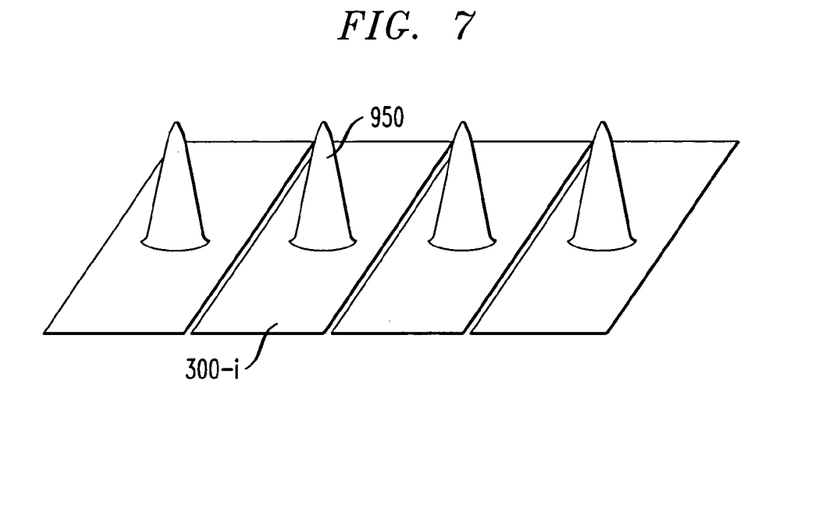
FIG. 7 depicts an illustrative optical energy distribution of a spatially resolved WDM signal as a function of position at the front focal plane of a collimating/focusing lens where an array of rotatable mirrors is positioned.

FIG. 7 depicts an illustrative (Gaussian) distribution 950 of optical energy as a function of position at the front focal plane of collimating/focusing lens 846, i.e., at the location of rotatable mirrors 300-i. The optical energy of the WDM signal has a Gaussian distribution centered about the center wavelength of each channel. Most of the optical energy for each channel is captured by a different one of rotatable mirrors 300-i. As shown in FIG. 7, the energy level peaks at the center wavelength of each channel, falls off to either side, and then rises toward the center of the next channel. Consequently, if adjacent mirrors in a mirror array are not very close to one another, there will be a loss of optical energy. This represents an "insertion loss" for a de-multiplexer. Furthermore, in the case of the prior-art gimbaled mirrors, optical energy impinging on a gimbal can be scattered, resulting in cross talk.

II. Fabrication of a Rotatable Element (or an Array thereof) In Accordance With the Principles of the Invention Those skilled in the art will be able to fabricate movable element 300 and an array 700 of such elements using standard micro-machining and photolithographic techniques. An illustrative fabrication method 1000 is depicted in FIG. 8 and described below. The operations of the method include:

1002: rotatably coupling, along a first rotational axis, a plate and a cradle, wherein the cradle does not encircle the plate;

1004: rotatably coupling, along a second rotational axis that is perpendicular to the first rotational axis, the cradle in a first substrate;

1006: forming at least two electrodes at a first region in a second substrate;

1008: forming at least two electrodes at a second region in the second substrate;

1010: aligning the first substrate with the second substrate such that the plate is superposed over the two electrodes at the first region and a portion of the cradle is superposed over the two electrodes at the second region; and 1012: attaching the first substrate to the second substrate.

The numerical designations 1002, 1004, etc., for the operations of method 1000 are not meant to imply a sequence or temporal order. That is, some of the operations can be carried out simultaneously, e.g., operations 1002 and 1004; operations 1006 and 1008; operations 1002/1004 and 1006/1008, etc., as desired. Method 1000 is described in further detail below.

The fabrication of rotatable element 300 or array 700 advantageously involves two multi-layer substrates. Rotatable elements 300 are formed in one of the substrates (operations 1002 and 1004) and electrodes 534 are formed in the other substrate (operations 1006 and 1008). The two substrates are then aligned (operation 1010) and attached (operation 1012) to one another.

The multi-layer substrate in which rotatable elements 300 are formed advantageously, but not necessarily, has three layers. Those layers include a top, relatively thin layer, a bottom, relatively thick layer, and an intermediate, relatively thin layer that is sandwiched between the top and bottom layers.

The top layer, which is typically in a range of about 1 to 2 microns thick, is used to form the "mechanical" portions of movable element 300, e.g., plate 302, cradle 304, plate support 306 and cradle support 310, etc. In some embodiments, the top layer is semiconductor, such as, without limitation, silicon or polysilicon.

In some embodiments, operations 1002 and 1004 are performed by patterning, etching and releasing movable elements 300. In particular, movable elements 300 are appropriately patterned and etched, e.g., reactive ion etching, etc., in the top layer. The etching proceeds to the intermediate layer and then stops. The intermediate layer, which is typically in a range of about 0.1 to 3 microns thick, functions as an etch stop or milling stop. The intermediate layer is advantageously formed from a material that resists being etched by processes that will readily etch the top and bottom layers. In some embodiments, the intermediate layer is an oxidized semiconductor material. When the top and bottom layers are formed from silicon or polysilicon, the intermediate layer is advantageously silicon oxide. While it is possible to fabricate rotatable element 300 without the use of an etch/milling stop, it is substantially more difficult to control the extent of etching/millings steps without it.

After movable elements 300 are patterned and etched into the top layer of the substrate, the bottom layer is processed. In preparation for this processing, the top layer is coated with oxide, e.g., to protect it during subsequent etching steps, etc. The thick bottom layer, which is typically in a range of about 50 to 750 microns thick, is thinned to about 250 microns, as appropriate. After thinning, the bottom layer is patterned and etched, e.g., deep reactive ion etching, etc., to create cavities under movable elements 300.

After the bottom layer is patterned and etched, any protective oxide layers are removed. At the same time, the intermediate ("etch-stop") layer is removed from beneath the mechanical elements that were patterned in the top layer. Removing the intermediate layer from beneath the mechanical elements "releases" them, such that they are then free to move. In some applications, such as when plates 302 are to be mirrors, the plates are then metallized or otherwise suitably processed.

In some embodiments, the multi-layer substrate is a silicon-on-insulator ("SOI") wafer. These wafers typically include a bottom silicon layer that is about 500 to 700 microns thick as a function of wafer diameter, an oxide layer, which is about 0.2 to 3 microns thick, disposed thereon, and a thin silicon layer that is about 0.1 to 10 microns thick that is disposed on the oxide layer. The arrangement and thickness of the layers are consistent with the nominal ranges for layer thickness that are provided above. SOI wafers are commercially available from SOI-TEC USA, Inc. of Peabody, Mass. and others. Alternatively, the multi-layer substrate can be made using a conventional silicon wafer, wherein oxide is deposited on the wafer and then polysilicon, etc., is deposited on the oxide.

The multi-layer substrate in which the electrodes 534 are formed advantageously, but not necessarily, also has three layers. Those layers include a base, thick layer, e.g., a silicon wafer, etc., an insulation layer, e.g., oxide, etc., and a top, conductive layer. The conductive layer can be formed from metal, such as, without limitation, aluminum or gold. Alternatively, the conductive layer can be formed from polysilicon that is doped, e.g., with boron, etc., to increase conductivity.

In some embodiments, operations 1006 and 1008 are performed by patterning and etching electrodes, wire traces, bonding pads, etc., in the top conductive layer. After the electrodes, etc., are patterned in the conductive layer, spacer material, typical an oxide, is deposited on the electrode wafer (on the thick layer) to a thickness of between about 10 to 20 microns. The spacer material is patterned to create set-offs that will separate rotatable elements 300 from the electrodes 534 in the fully-fabricated array (e.g., array 700).

After the appropriate elements are formed in each substrate, the substrates are brought together for bonding. The substrate containing array 700 of rotatable elements 300 is "flipped" so that the "top" layer of the substrate, i.e., the layer in which the rotatable elements are formed, faces the set-offs that were formed on the substrate having electrodes 534. In accordance with operation 1010, the substrates are aligned. After the substrates are properly aligned, they are joined in well-known fashion, e.g., fusion bonding, etc., in accordance with operation 1012. As a consequence of these operations, movable elements 300 are suspended over electrodes 534.

It is to be understood that the above-described embodiments are merely illustrative of the present invention and that many variations of the above-described embodiment can be devised by one skilled in the art without departing from the scope of the invention. It is therefore intended that such variations be included within the scope of the following claims and their equivalents.

We claim:

1. Apparatus, comprising:
a plurality of ports, at least one of said ports configured to be an input port and one or more of said ports configured to be output ports;
a diffraction grating adapted to be optically coupled to at least two of said plurality of ports; and
a mirror array adapted to be optically coupled to the diffraction grating, wherein:
the mirror array comprises a frame and a plurality of rotatable elements, each rotatable element having a mirror adapted to rotate with respect to the frame;
the diffraction grating is adapted to produce from a wavelength-division multiplexed (WDM) signal applied to the input port a plurality of spatially separated optical signals corresponding to components of said WDM signal;
each mirror in the array is adapted to receive a respective one of said spatially separated optical signals and direct the respective received signal back to the diffraction grating, which further directs said respective signal to a respective one of said output ports, wherein the respective output port to which said respective signal is directed is a function of the orientation of the respective mirror with respect to the frame; and
each of said rotatable elements comprises:
a cradle;
a plate, having a reflective portion functioning as the respective mirror, that is rotatably coupled to the cradle along a first rotational axis, wherein (i) the plate has a footprint that extends outside of a footprint of the cradle, (ii) the frame is fixedly attached to a first substrate, and (iii) the cradle is rotatably coupled to the frame along a second rotational axis; and
first and second electrodes formed at a second substrate, wherein the first substrate is attached to the second substrate such that the plate is superposed over the first electrode and the cradle is superposed over the second electrode.

2. The apparatus of claim 1, wherein the first rotational axis and the second rotational axis are substantially perpendicular.

3. The apparatus of claim 1, wherein the plate, the cradle, and the frame are made, at least in part, from a material selected from the group consisting of silicon and polysilicon.

4. The apparatus of claim 1, wherein each of said rotatable elements comprises a third electrode, wherein the first electrode and the third electrode:
are symmetrically disposed on opposite sides of the first rotational axis; and
are disposed close enough to the plate so that under an applied voltage of less than 200 volts, at least one of the first electrode and the third electrode electrically interacts with the plate.

5. The apparatus of claim 4, wherein each of said rotatable elements comprises a fourth electrode, wherein the second electrode and the fourth electrode are:
symmetrically disposed on opposite sides of the second rotational axis; and
disposed close enough to the cradle so that, under an applied voltage of less than 200 volts, at least one of the second electrode and the fourth electrode electrically interacts with the cradle.

6. The apparatus of claim 1, wherein reflective portions corresponding to different rotatable elements in the array form a substantially contiguous segmented mirror.

7. The apparatus of claim 1, wherein:
each respective plate has a center of mass; and
each of said rotatable elements comprises a plurality of electrodes adapted to electrically interact with the respective plate, wherein a center of mass of said plurality of electrodes does not align with the center of mass of the respective plate.

8. The apparatus of claim 1, wherein:
the plate is rotatably coupled to the cradle via one or more torsional members attached between the plate and the cradle;
the cradle is rotatably coupled to the frame via one or more torsional members attached between the cradle and the frame; and
at least one of the torsional members comprises a connector and a cross-piece joined in a T-shaped configuration.

9. The apparatus of claim 8, wherein the cross-piece is adapted to function as a shock absorber.

10. Apparatus, comprising:
a plurality of ports, at least one of said ports configured to be an input port and one or more of said ports configured to be output ports;
a diffraction grating adapted to be optically coupled to at least two of said plurality of ports; and
a mirror array adapted to be optically coupled to the diffraction grating, wherein:
the mirror array comprises a frame and a plurality of rotatable elements, each rotatable element having a mirror adapted to rotate with respect to the frame;
the diffraction grating is adapted to produce from a wavelength-division multiplexed (WDM) signal applied to the input port a plurality of spatially separated optical signals corresponding to components of said WDM signal;
each mirror in the array is adapted to receive a respective one of said spatially separated optical signals and direct the respective received signal back to the diffraction grating, which further directs said respective signal to a respective one of said output ports, wherein the respective output port to which said respective signal is directed is a function of the orientation of the respective mirror with respect to the frame; and each of said rotatable elements comprises:
- a cradle;
- a plate, having a reflective portion functioning as the respective mirror, that is rotatably coupled to the cradle along a first rotational axis, wherein the cradle is rotatably coupled to the frame along a second rotational axis and does not entirely surround the plate; and
- a first electrode and a second electrode, wherein said first electrode and said second electrode are: (i) symmetrically disposed on opposite sides of said first rotational axis and (ii) disposed close enough to the plate so that, under an applied voltage of less than 200 volts, at least one of the first electrode and the second electrode electrically interacts with the plate.

11. The apparatus of claim 10, wherein each rotatable element comprises a third electrode and a fourth electrode, wherein the third electrode and the fourth electrode are:
- symmetrically disposed on opposite sides of said second rotational axis; and
- disposed close enough to said cradle so that under an applied voltage of less than 200 volts, at least one of the third electrode and the fourth electrode electrically interacts with the cradle.

12. The apparatus of claim 10, wherein the first rotational axis and the second rotational axis are substantially perpendicular.

13. The apparatus of claim 10, wherein the plate, the cradle, and the frame are made, at least in part, from a material selected from the group consisting of silicon and polysilicon.

14. The apparatus of claim 10, wherein reflective portions corresponding to different rotatable elements in the array form a substantially contiguous segmented mirror.

15. The apparatus of claim 10, wherein:
- the plate is rotatably coupled to the cradle via one or more torsional members attached between the plate and the cradle;
- the cradle is rotatably coupled to the frame via one or more torsional members attached between the cradle and the frame; and
- at least one of the torsional members comprises a connector and a cross-piece joined in a T-shaped configuration.

16. The apparatus of claim 15, wherein the cross-piece is adapted to function as a shock absorber.

17. Apparatus, comprising:
a plurality of ports, at least one of said ports configured to be an input port and one or more of said ports configured to be output ports;
a diffraction grating adapted to be optically coupled to at least two of said plurality of ports; and
a mirror array adapted to be optically coupled to the diffraction grating, wherein:
the mirror array comprises a frame and a plurality of rotatable elements, each rotatable element having a mirror adapted to rotate with respect to the frame;
the diffraction grating is adapted to produce from a wavelength-division multiplexed (WDM) signal applied to the input port a plurality of spatially separated optical signals corresponding to components of said WDM signal;
each mirror in the array is adapted to receive a respective one of said spatially separated optical signals and direct the respective received signal back to the diffraction grating, which further directs said respective signal to a respective one of said output ports, wherein the respective output port to which said respective signal is directed is a function of the orientation of the respective mirror with respect to the frame; and each of said rotatable elements comprises:
- a cradle;
- a plate having a reflective surface functioning as the respective mirror and rotatably coupled to the cradle along a first rotational axis; and
- a frame, wherein the cradle is rotatably coupled to the frame along a second rotational axis and does not surround at least a portion of the plate, wherein reflective portions of the plates of different rotatable elements in the array form a substantially contiguous segmented mirror.

18. A method of routing light, comprising:

(A) spectrally decomposing a wavelength-division multiplexed (WDM) signal to produce a plurality of spatially separated optical signals corresponding to components of said WDM signal such that each spatially separated optical signal is directed to a respective mirror of a mirror array;

(B) orienting each respective mirror with respect to a frame to direct the respective spatially separated signal to a respective output port of a plurality of output ports, wherein the respective output port to which the respective spatially separated signal is directed is a function of the orientation of the respective mirror with respect to the frame, wherein:

the mirror array comprises the frame and a plurality of rotatable elements, each rotatable element having the respective mirror;

each of said rotatable elements comprises:
- a cradle;
- a plate, having a reflective portion functioning as the respective mirror, that is rotatably coupled to the cradle along a first rotational axis, wherein (i) the plate has a footprint that extends outside of a footprint of the cradle, (ii) the frame is fixedly attached to a first substrate, and (iii) the cradle is rotatably coupled to the frame along a second rotational axis; and
- first and second electrodes formed at a second substrate, wherein the first substrate is attached to the second substrate such that the plate is superposed over the first electrode and the cradle is superposed over the second electrode; and the step of orienting comprises applying one or more respective voltages to at least one of the respective first and second electrodes to establish the orientation of the respective mirror with respect to the frame.

19. Apparatus, comprising:
a plurality of means for guiding light, at least one of said means for guiding configured to be an input port and one or more of said means for guiding configured to be output ports;
means for diffracting light adapted to be optically coupled to at least two of said means for guiding; and means for routing light adapted to be optically coupled to the means for diffracting, wherein:
the means for routing comprises a stationary part and a plurality of movable parts, each of said movable parts having means for reflecting light adapted to rotate with respect to the stationary part;
the means for diffracting is adapted to produce from a wavelength-division multiplexed (WDM) signal applied to the input port a plurality of spatially separated optical signals corresponding to components of said WDM signal;
each means for reflecting is adapted to receive a respective one of said spatially separated optical signals and direct the respective received signal back to the means for diffracting, which further directs said respective signal to a respective one of said output ports, wherein the respective output port to which said respective signal is directed is a function of the orientation of the respective means for reflecting with respect to the stationary part; and
each of said movable parts comprises:
the respective means for reflecting;
means for supporting the respective means for reflecting, wherein (i) the respective means for reflecting is rotatably coupled to the means for supporting along a first rotational axis; (ii) the means for supporting has a footprint that extends outside of a footprint of the means for reflecting and is rotatably coupled to the stationary part along a second rotational axis, and (iii) the stationary part is fixedly attached to a first substrate;
means for orienting the means for supporting with respect to the stationary part; and
means for orienting the means for reflecting with respect to the means for supporting, wherein (i) both of said means for orienting are formed at a second substrate and (ii) the first substrate is attached to the second substrate.

* * * * *